United States Patent [19]

Ancketill

[11] Patent Number: 5,195,459
[45] Date of Patent: Mar. 23, 1993

[54] BIRD FEEDERS

[76] Inventor: David Ancketill, 25 Sunningfields Rd., Hendon, London NW4 4QR, England

[21] Appl. No.: 845,688

[22] Filed: Mar. 4, 1992

[30] Foreign Application Priority Data

Mar. 6, 1991 [GB] United Kingdom ............... 9104688

[51] Int. Cl.$^5$ ................................................ A01K 39/01
[52] U.S. Cl. ........................................ 119/57.9; 119/52.3
[58] Field of Search .............. 119/57.9, 57.8, 900, 119/52.3, 52.2

[56] References Cited

U.S. PATENT DOCUMENTS

| | | | |
|---|---|---|---|
| 3,145,690 | 8/1964 | Bachman | 119/52.3 |
| 4,030,451 | 6/1977 | Miller | 119/57.9 |
| 4,207,839 | 6/1980 | Barry | 119/57.9 |
| 4,541,362 | 9/1985 | Dehls | 119/51 R |
| 4,646,686 | 3/1987 | Farlani | 119/57.9 |
| 5,016,573 | 5/1991 | Power | 119/57.9 |
| 5,048,461 | 9/1991 | Wessner | 119/57.9 |

FOREIGN PATENT DOCUMENTS 2236468 4/1991 United Kingdom .

Primary Examiner—John G. Weiss
Attorney, Agent, or Firm—MacMillan, Sobanski & Todd

[57] ABSTRACT

A bird feeder comprises: a food holder and shroud which is biased in an open position by a spring. When an animal such as a squirrel not intended to feed from the bird feeder lands on the shroud or a roof portion of the shroud, the weight of the animal causes the shroud to descend against the biasing action of the spring. The shroud closes the food holder thereby preventing he animal from gaining access to the food.

13 Claims, 1 Drawing Sheet

BIRD FEEDERS

This invention relates to bird feeders and in particular to bird feeders which prevent squirrels from gaining access to the food.

Various different types of bird feeders are known in the art. They usually comprise a container made from a wire mesh material, the openings in the mesh being large enough for birds to be able to access food within the container but small enough to contain the food therein. A hook is provided so that the container can be hung from the branch of a tree or other suitable supporting point.

The immense ingenuity of squirrels to gain access to bird food held in such feeders is well known. This is so even when the feeder is hung in seemingly inaccessible places. This is not the only problem. Squirrels tend to attack the feeders and break into them causing not only loss of the food but loss of the feeder.

Numerous attempts have been made in the past to make a feeder which is strong enough to stand up to the squirrels and which is configured such that the squirrels cannot gain access to the food. Hitherto, no satisfactory feeder has been devised.

U.S. Pat. No. 4,646,686 (Furlani) relates to a selective bird feeder in which a transparent feed container is located within a transparent shroud. The shroud is supported on the container by a spring for movement between a bird feeding position and a position in which heavier birds or animals cause the shroud to block access to the feed. The container is disposed concentrically with respect to the shroud when the feeder is in an open state. Perches are supported on the shroud adjacent access openings in the shroud and container. Light birds can obtain feed through the openings while heavier ones or animals cannot.

Both the shroud and the container of this feeder are essentially made of transparent (ie. perspex), solid materials into which access holes have been bored.

These feeders are unsatisfactory for the following reasons. They are expensive to produce, very few access openings can be provided, and the transparent materials can be quickly eaten or destroyed by the squirrels. The problem with the access openings becomes worse as the feeder empties because food is accessible through fewer and fewer access openings. When the feeder is half empty, food can only be obtained via one opening so that the feeder can only be used by one bird at a time.

It is an aim of the present invention to provide a bird feeder which offers much greater resistance to the squirrels on the one hand whilst not restricting access to birds on the other hand.

According to the present invention there is provided a bird feeder comprising: a food holder, for containing bird food, having a sidewall including apertures for permitting birds access to the food; attachment means for allowing the bird feeder to be suspended from a fixing point; a shroud movably mounted on the bird feeder between an open position at least in which substantially all of the apertures are accessible to birds and a closed position in which the shroud surrounds the sidewall so as to prevent access to the food; and bias means for maintaining the shroud in the open position except when an animal having a weight exceeding a predetermined level attempts to gain access to the food by standing on the shroud whereby the shroud descends to the closed position under the weight of the animal against the action of the bias means.

In a preferred embodiment, the bird feeder comprises a support for supporting the food holder at one end thereof, the attachment means being supported at the other end of the support for allowing the bird feeder to be suspended from a fixing point.

In a preferred embodiment, the shroud is formed of metal to ensure resistance to attack by squirrels. The sidewall is preferably of mesh formed of galvanised wire for durability not only against attack from squirrels but also from the weather. Alternatively, the mesh may be formed of stainless steel or perforated sheet metal.

The shroud is spaced from the food holder by no more than 1 to 1.5 mm so as to prevent the squirrel from forcing their claws between the shroud and food holder and forcing the latter open.

The distance between the attachment of the bird feeder and the lower open end of the shroud is preferably greater than the reach of the squirrel in order to prevent the squirrel from hanging from the attachment means with its hind legs and forcing open the food holder with its claws.

Embodiments of the invention have the advantage that they offer an effective and durable squirrel proof bird feeder. There is no need to provide perches as the birds can perch directly on the mesh.

The invention will now be further described by way of example, with reference to the accompanying drawings, in which:

FIG. 2b is a front view of the closure cap of FIG. 2a;

Figure 2A:
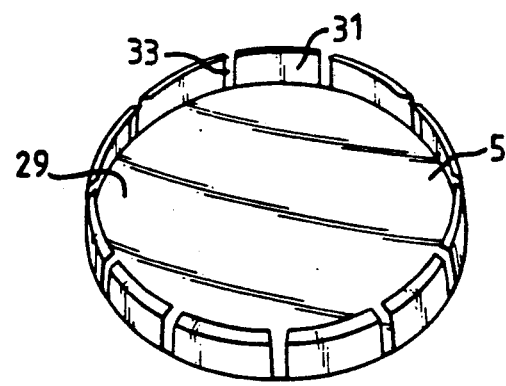
FIG. 2a is a perspective view of a closure cap for the bird feeder.
Figure 2B:
Figure 2C:
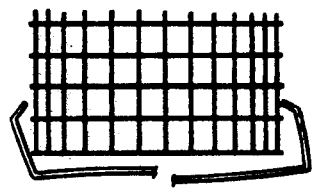
FIG. 2c is a fragmentary diagrammatic view illustrating the bird feeder closure cap open on the left and closed on the right.
Figure 2D:
Figure 2E:
Figures 2F, 2G:

FIGS. 2d through 2g are additional fragmentary diagrammatic views illustrating the bird feeder closure cap open in FIGS. 2e and 2f and closed in FIGS. 2d and 2g.

Figure 1:
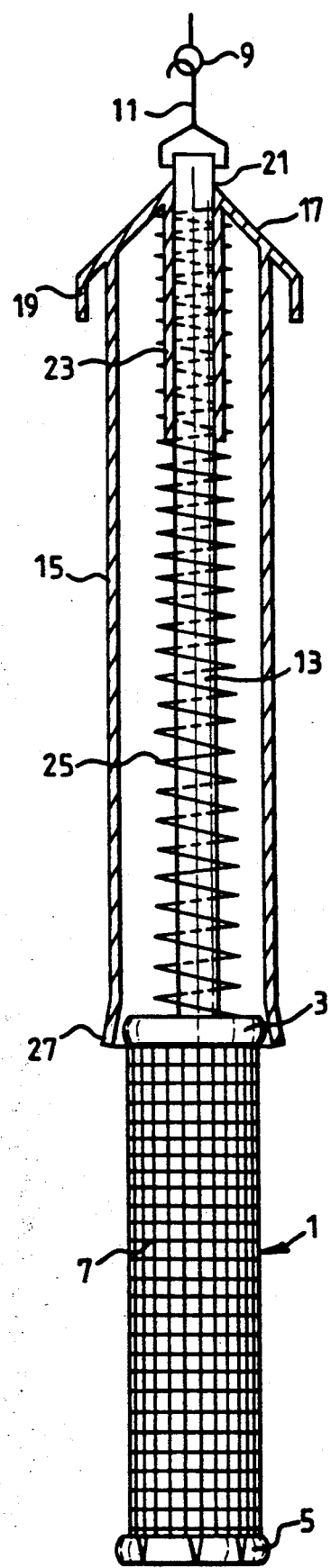
FIG. 1 is a sectional view of a bird feeder embodying the present invention.

FIG. 1 illustrates a bird feeder comprising a food holder 1 made of a galvanised wire mesh material. The food holder is generally cylindrical in shape and attached at one end to a support 3. The food holder 1 is closed at its other end by means of a closure cap 5. The food holder 1 has a multiplicity of openings 7 by virtue of the fact that the food holder side wall is formed from the mesh material. The openings 7 are sufficiently small to contain bird food within the food holder 1 but sufficiently large to enable birds to gain access to the food.

The food holder 1 is connected to a fixing point 9 via a hook 11 connected to one end of a rod 13 of the bird feeder. The other end of the rod 13 is connected to, and in effect forms the support 3 to which the food holder 1 is attached. The hook 11 forms the attachment means of the bird feeder.

A shroud 15 formed from a metallic material such as copper, steel or aluminium is slidably and movably mounted on the rod 13. For ease of manufacture, the shroud 15 may be formed from a generally cylindrical tubular material. A roof portion 17 is formed from wood or a plastics material. The roof portion is pitched so as to provide a surface which is difficult for squirrels to grip hold of. The roof portion 17 has a downwardly depending portion 19. The roof portion 17 can be attached to the end of the shroud 15 by any one of a number of methods which would be evident to a man skilled in the art of bird feeders. The rod 13 extends through an opening 21 provided in the roof portion 17. A sleeve 23 extends downwardly from the opening 21 and has a diameter slightly larger than that of the rod 21 for allowing the roof portion 17 and shroud 15 to slide freely on the rod 13.

A helical spring 25 is disposed between the roof portion 17 and the support 3 for maintaining the shroud in an open position. The force constant of the spring is such that the spring overcomes the weight of the shroud and the roof portion in order to maintain them in the open position, but is sufficiently small for the shroud 15 and roof portion 17 to descend against biasing action of the spring 25 when an animal not intended to feed from the the bird feeder stands on the shroud 15 or roof portion 17.

The helical spring 25 lies on the outer surface of the sleeve 23 in FIG. 1. However, the helical spring 25 may alternatively be housed between the rod 13 and the inside surface of the sleeve 23 provided that the inside diameter of the sleeve 23 is large enough to accommodate both the spring 25 and the rod 13. The advantage with this latter configuration is that the spring 25 gathers in the annular space between the rod 13 and the sleeve 23 as the shroud 15 descends. The degree to which the spring buckles laterally is reduced thereby enhancing the durability and smooth operation of the bird feeder.

The bird feeder is preferably hung from a fixing point 9 which is sufficiently isolated to prevent an unwanted animal, in particular a squirrel, jumping from a tree directly on to the food holder 1. In this case, the only way the animal can gain access to the food holder is by climbing onto the roof portion 17 and shroud 15 via the fixing point 9. The shroud 15 will then descend under the weight of the animal so as to cover the food holder 1 thereby preventing the animal from gaining access to the food.

The length of the shroud 15 is preferably at least as long as the length of the food holder 1 so that the open end 27 of the shroud 15 extends to below the cap 5 when in the closed position. The length of the shroud however, should be greater than the combined food holder 1 and the spring when in its compressed state.

The open end 27 is flared. This strengthens the shroud so as to prevent it from becoming deformed if the bird feeder is dropped.

The shroud 15 and food holder 1 are preferably cylindrical and are of similar dimension so that there is only 1 to 1.5 mm space between the inner surface of the shroud 15 and the outer surface of the food holder 1. This makes it difficult or impossible for a squirrel to force its claws between the shroud and food holder with a view to gaining access to the food holder by forcing off the cap 5. The shape may be other than cylindrical, such as square. The important aspect is that the shape of the food holder 1 matches the shape of the shroud, that is to say, the shroud slides closely over the food holder 1.

The length of the shroud 15 is at least as long as the reach of the squirrel to prevent the squirrel from gripping the fixing point 9 or hook 11 with its hind legs and extending over the length of the shroud 15 to reach the cap 5 with its claws without putting weight onto the shroud 15. A minimum length might be of the order of 250 cms. The height of the roof portion 17 may be of the order of 4.5 cms. The diameter of the shroud itself may be of the order of 5 cms.

FIGS. 2a to 2b illustrate the configuration and operation of the closure cap 5.

The closure cap 5 comprises a metallic disc 29 and side flanges 31 resiliently connected to the disc 29. The side flanges 31 are spaced by slits 33 which permit the flanges to open and close as the closure cap 5 is pressed over the open end of the food holder 1.

As the closure cap 5 is urged over the open end of the food holder 1, the flanges 31 open outwardly and the disc adopts a concave position as illustrated in figure 2f.

As the flanges 33 move over the open end of the food holder 1, the concave base adopts a convex position as illustrated in FIG. 2g and the slits 33 close. The closure cap 5 thereby establishes a secure snap-fit over the open end of the food holder 1.

This type of closure cap 5 is found to be simple but effective way of closing the food holder 1.

I claim:

1. A bird feeder comprising: a food holder, for containing bird food, having a sidewall formed from a mesh defining apertures for permitting birds access to the food; attachment means for allowing the bird feeder to be suspended from a fixing point; a shroud movably mounted on the bird feeder between an open position in which substantially all of the apertures are accessible to birds and a closed position in which the shroud surrounds the sidewall so as to prevent access to the food; and bias means for maintaining the shroud in the open position except when an animal having a weight exceeding a predetermined level attempts to gain access to the food by standing on the shroud whereby the shroud descends to the closed position under the weight of the animal against the action of the bias means.

2. A bird feeder according to claim 1, comprising a support for supporting the food holder at one end thereof, the attachment means being supported at the other end of the support for allowing the bird feeder to be suspended from fixing point.

3. A bird feeder according to claim 2, wherein the support is in the form of a rod on which the shroud is slidably mounted.

4. A bird feeder according to claim 3, wherein the bias means is in the form of a helical spring positioned on the rod and is disposed between the shroud and the food holder.

5. A bird feeder according to claim 1, wherein the shroud is formed of metal and without apertures at least in a portion of the shroud lying adjacent to the sidewalls when in the closed position.

6. A bird feeder according to claim 5, wherein the metal is one of: copper, steel or aluminium.

7. A bird feeder according to claim 1 wherein the mesh is of galvanized wire or stainless steel mesh or perforated sheet metal.

8. A bird feeder according to claim 1, wherein the inner surface of the shroud has substantially the same shape as the outer surface of the sidewall.

9. A bird feeder according to claim 1, wherein the inside wall of the shroud and the outside wall of the food holder are spaced apart by 1 to 1.5 mm.

10. A bird feeder according to claim 1, wherein the shroud and the food holder are both cylindrical.

11. A bird feeder according to claim 1, wherein the distance between the attachment means and the end of the shroud remote therefrom is greater than the reach of a squirrel.

12. A bird feeder according to claim 1, wherein the end of the shroud remote from the attachment means is flared so as to strengthen the said end of the shroud.

13. A bird feeder according to claim 1, wherein the food holder is elongate and open at one end, a cap being provided for closing the open end and being secured thereto by way of a snap-fit.

* * * * *